United States Patent
Iwamura et al.

(10) Patent No.: US 7,492,784 B2
(45) Date of Patent: Feb. 17, 2009

(54) CALL ACCEPTANCE CONTROL METHOD, MOBILE COMMUNICATION SYSTEM AND BASE STATION DEVICE

(75) Inventors: Mikio Iwamura, Zushi (JP); Yoshihiro Ishikawa, Yokosuka (JP); Seizo Onoe, Yokohama (JP); Takehiro Nakamura, Yokosuka-sho (JP); Takahiro Hayashi, Yokosuka (JP); Yoshiaki Oofuji, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 1399 days.

(21) Appl. No.: 10/044,945

(22) Filed: Jan. 15, 2002

(65) Prior Publication Data
US 2002/0110090 A1    Aug. 15, 2002

(30) Foreign Application Priority Data
Jan. 16, 2001    (JP)    ............................ P2001-008124

(51) Int. Cl.
*H04J 3/16*    (2006.01)
(52) U.S. Cl. ......................... 370/437; 370/230; 370/329
(58) Field of Classification Search ................. 370/230, 370/329, 437
See application file for complete search history.

(56) References Cited

U.S. PATENT DOCUMENTS

| | | | |
|---|---|---|---|
| 5,949,757 A | 9/1999 | Katoh et al. | |
| 6,850,540 B1* | 2/2005 | Peisa et al. | 370/468 |
| 6,909,690 B1* | 6/2005 | Xu et al. | 370/230 |
| 6,944,449 B1* | 9/2005 | Gandhi et al. | 455/425 |
| 6,975,609 B1* | 12/2005 | Khaleghi et al. | 370/335 |

FOREIGN PATENT DOCUMENTS

| | | |
|---|---|---|
| DE | 198 21 456 | 11/1999 |
| EP | 0 831 669 | 3/1998 |

OTHER PUBLICATIONS

Pending U.S. Appl. No. 10/044,945, filed Jan. 15, 2002.
Pending U.S. Appl. No. 10/054,992, filed Jan. 25, 2002.
Pending U.S. Appl. No. 10/067,945, filed Feb. 8, 2002.

* cited by examiner

*Primary Examiner*—Firmin Backer
*Assistant Examiner*—Jason Mattis
(74) *Attorney, Agent, or Firm*—Oblon, Spivak, McClelland, Maier & Neustadt, P.C.

(57) ABSTRACT

Resource measurement device 32 acquires a measured value x of the resource use condition in transmitting/receiving section 20 in respect of the wireless resource that is the subject of monitoring. Also, correction value calculation device 33 calculates a correction value in accordance with the number of packet users at transmitting/receiving section 20 and adjustment device 34 adjusts the call acceptance threshold value $x_c$ using the correction value, so as to obtain a corrected threshold value $x_c'$. Comparator 35 then compares the measured value of the resource use condition x and the corrected threshold value $x_c'$ and outputs the comparison result to call acceptance control device 31. If $x \geq x_c'$, call acceptance control device 31 restricts acceptance of new calls. Thus, the call acceptance control method, mobile communication system and base station device whereby deterioration of communication quality is suppressed irrespective of the switching system are provided in mobile communication in which multiple access is performed with shared wireless resources.

3 Claims, 10 Drawing Sheets

CALL ACCEPTANCE CONTROL METHOD, MOBILE COMMUNICATION SYSTEM AND BASE STATION DEVICE

BACKGROUND OF THE INVENTION

1. Field of the Invention

The present invention relates to a call acceptance control method, mobile communication system and base station device employed in mobile communications in which multiple access is effected with shared wireless resources.

2. Related Background Art

In a mobile communication system comprising a wireless base station and a plurality of mobile stations, data communication (transmission/reception) is performed by wireless communication circuits between the base station and the mobile stations. Circuit switching systems and packet switching systems are examples of switching systems employed in such data transmission/reception.

A circuit switching system is a system in which fixed wireless resources are occupied in respect of communication with a user connected by a circuit switching call, irrespective of whether or not data is transferred. A certain rate of call loss occurs in this system, but it has the advantage that data transfer delay does not occur, so it is suited to a communication service with a high degree of real-time character, such as voice communication.

In contrast, the packet switching system is a system wherein the data that is transferred in respect of a user connected by a packet call is constituted by small data units called packets; in this system, the data is transferred in packet units and wireless resources are only occupied as necessary. In this system, a certain degree of data transfer delay occurs, but wireless resources are allocated at each time-point in accordance with the degree of necessity of transmission/reception of data from a plurality of call sources (mobile stations). It therefore has the advantage that it enables efficient use of shared wireless resources in a plurality of communications and is suited for communication services of a low degree of real-time character, such as communications wherein the amount of data transferred changes irregularly and/or communications having a burst character. Such packet switching systems are employed in data communication on Internet connections or for transfer of control signals.

SUMMARY OF THE INVENTION

In mobile communication systems as mentioned above, when either of the circuit switching system or packet switching system is used as the switching system, data transmission/reception is performed by multiple access by a plurality of users sharing the same wireless resource.

For example, in the case of the code division multiple access (CDMA) systems, the channels of a plurality of users are multiplexed in the same wireless frequency band and wireless resources such as the amount of up-link interference, the down-link transmission power, and spreading code are shared by a plurality of users.

Spreading codes are allocated to each user in the multiple access using a CDMA system and are employed for identification of the channel of each user. By employing mutually orthogonal spreading codes under synchronization as these spreading codes, channels can be prevented from affecting each other, so a group of orthogonal spreading codes is employed on the down-link circuit (i.e. transmission from the base station to the mobile station) on which synchronization is easy to achieve. However, there is an upper limit on the number of mutually orthogonal spreading codes, so this restricted number of spreading codes is shared by a plurality of users.

Also, on the up-link circuit (transmission from the mobile station to the base station) the channels from different users act as mutually interfering waves. In regard to such channel interference, it is possible to increase the transmission power of the channels from the mobile stations in order to ensure the necessary communication quality even when the amount of up-link interference has increased, due to the number of users performing simultaneous transmission/reception of data becoming large. However, there is an upper limit on the transmission power, so lowering of communication quality occurs when the amount of up-link interference exceeds a limiting value. That is, on the up-link circuits of a CDMA system, a limited amount of up-link interference is shared by a plurality of users. Also, on the down-link circuits of the CDMA system, limited transmission power from the base station is shared by a plurality of users.

Also, even if the frequency division multiple access (FDMA) system or time division multiple access (TDMA) system is employed, the same wireless resource is shared by a plurality of users in the same way as in the case of a CDMA system. In the case of an FDMA system, wireless resources such as base station modem device, transmission power and carriers etc are shared. Also, in the case of a TDMA system, wireless resources such as base station modem device, transmission power and time slots are shared.

If, with regard to limited wireless resources as aforementioned that are shared by a plurality of users, all of the call requests created by circuit switching calls or packet calls etc originated from the users are accepted, there is a problem that the shared wireless resources are insufficient, producing deterioration of communication quality for all users.

In order to avoid such deterioration of communication quality, in a mobile communication system, call acceptance control is performed whereby call acceptance at each time-point is controlled in accordance with the condition of use of the wireless resources. One method of controlling call acceptance is for example to set up a call acceptance threshold value defining an upper limit in respect of the condition of use of the wireless resources and to restrict new call acceptance in periods where the measured value of the resource use condition exceeds this call acceptance threshold value.

However, comparing the circuit switching system and the packet switching system, the method of occupation of wireless resources in the respective switching systems described above is different. Consequently, regarding the resource use conditions in each switching system, whereas, in the case of the circuit switching system, fluctuation is comparatively small, in a packet switching system, there are large fluctuations in the resource use condition, due to the burst character of this system. Consequently, in a mobile communication system in which both a circuit switching system and a packet switching system are present, it is not possible to achieve a sufficient guarantee of communication quality by call acceptance control involving only setting a call acceptance threshold value.

Figure 8:
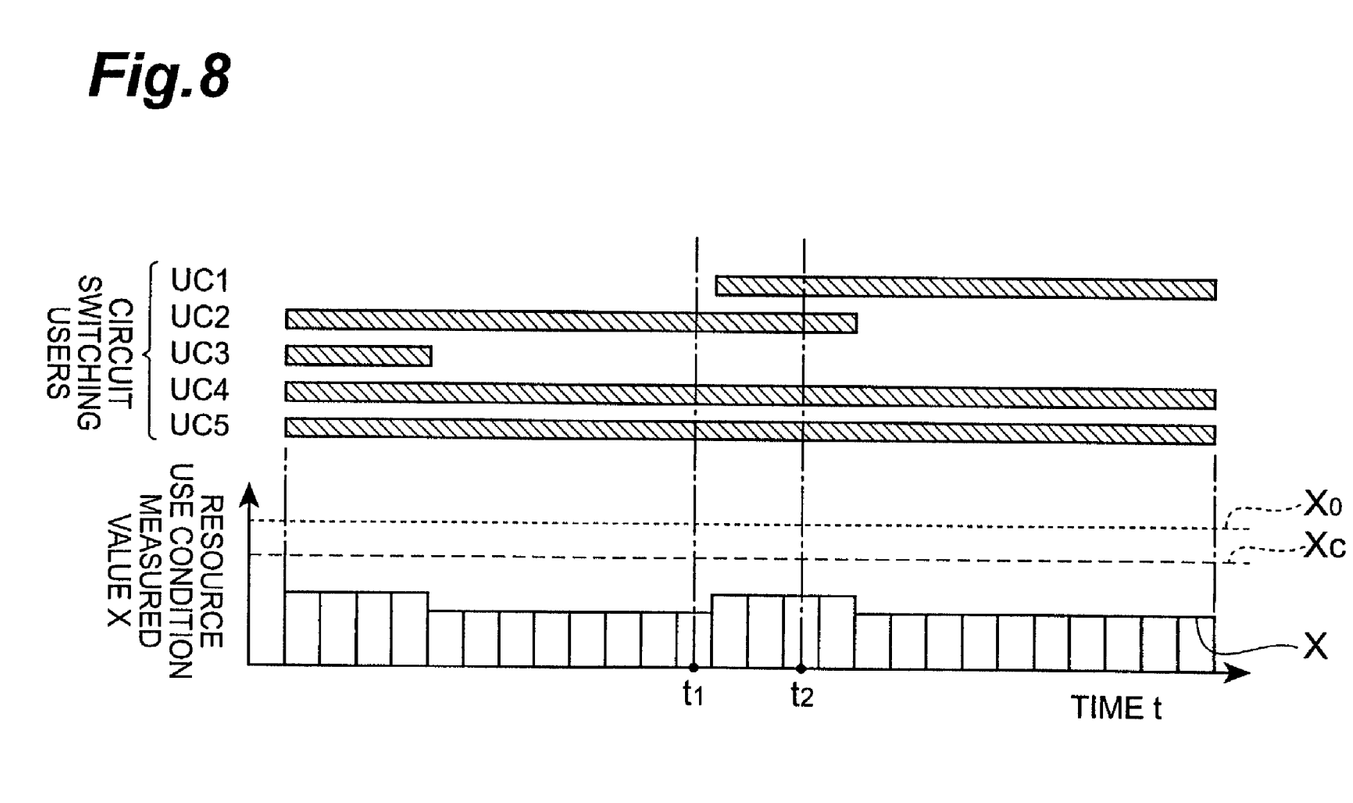
FIG. 8 is a graph illustrating the communication condition in a mobile communication system in which only circuit switching calls are present.
Figure 9:
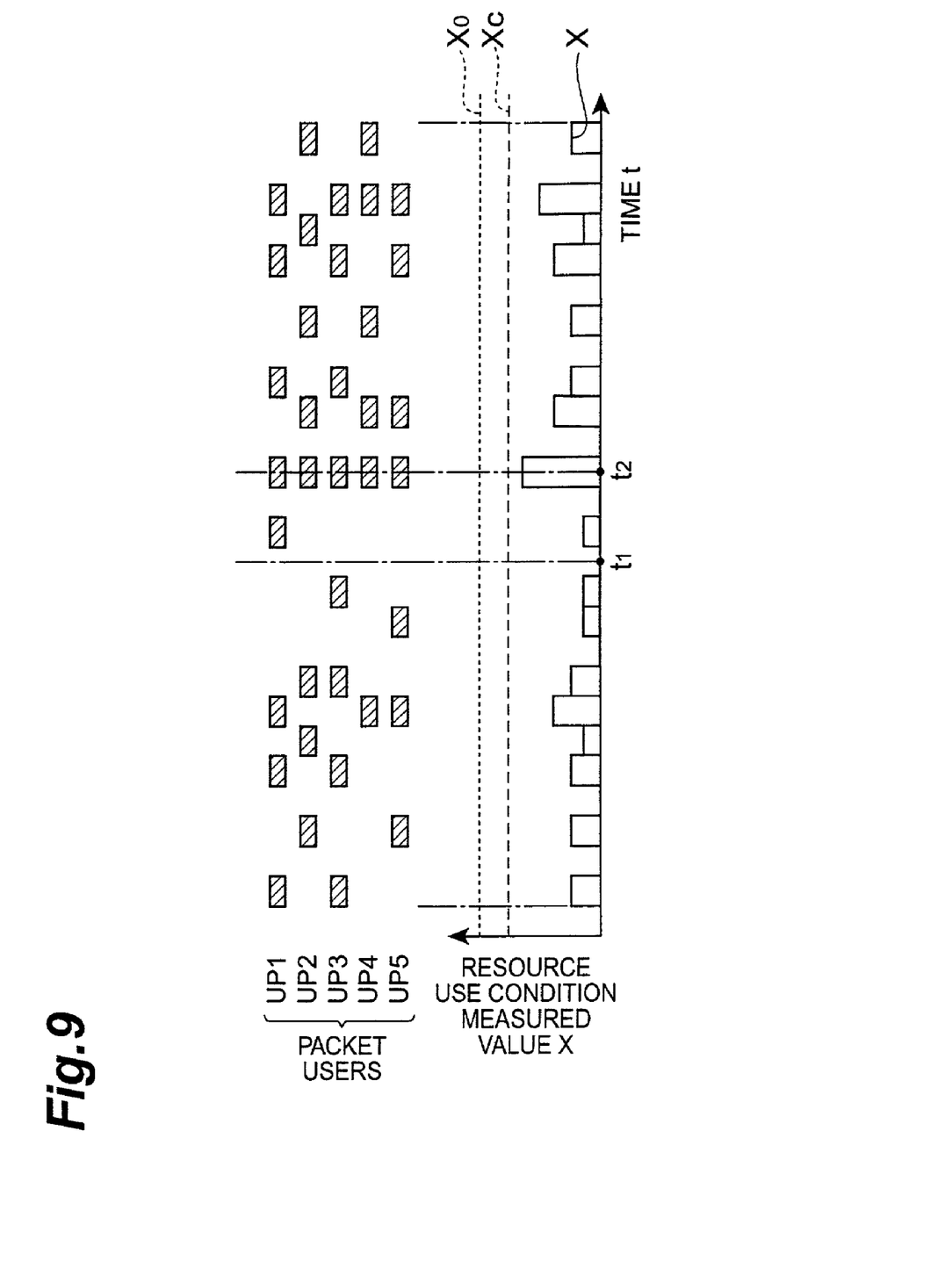
FIG. 9 is a graph illustrating the communication condition in a mobile communication system in which only packet calls are present.
Figure 10:
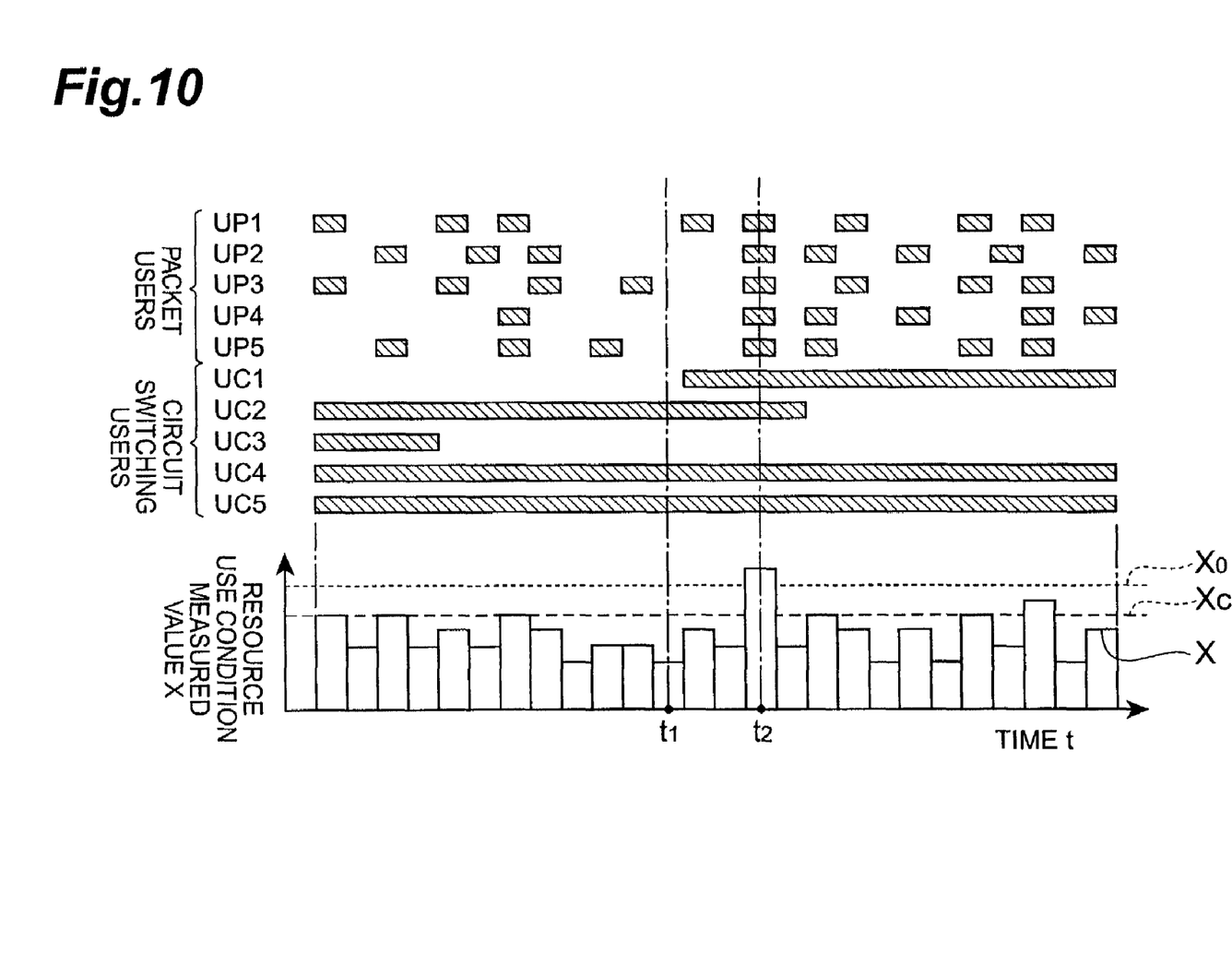
FIG. 10 is a graph illustrating the communication condition in a mobile communication system in which both circuit switching calls and packet calls are present.

FIG. 8 to FIG. 10 are respectively views illustrating the change with time of the connection condition of the users and the use condition of wireless resources when multiple access of a plurality of users is performed in a mobile communication system. In these Figures, for a measured value x of the resource use condition, the set call acceptance threshold value is shown as $x_c$ and the quality deterioration threshold value at which deterioration of communication quality actually occurs is shown as $x_0$, respectively.

FIG. 8 is a graph showing the change with time t of the connection condition (resource occupation condition) and measured value x of the resource use condition by circuit switching users UC1 to UC5. That is, this graph shows the communication condition in a mobile communication system in which only circuit switching calls in accordance with a circuit switching system are present. In such a mobile communication system, since the resource is continuously occupied by the respective users during connection, as in the example of time-point $t_1$ and $t_2$ shown in FIG. 8, fluctuation of the number of users performing simultaneous communication at each time-point is small, so there is little fluctuation of the resource use condition.

In contrast, FIG. 9 is a graph showing the change with time t of the connection condition and the measured value x of the resource use condition by packet users UP1 to UP5. That is, this graph shows the communication condition in a mobile communication system in which only packet calls produced by a packet switching system are present. In such a mobile communication system, due to the burst character etc, the number of simultaneously communicating users and the resource use condition at each time-point fluctuate considerably as in the examples of time-point $t_1$ and $t_2$ shown in FIG. 9.

FIG. 10 shows the communication condition in a mobile communication system in which circuit switching calls and packet calls, which have different fluctuation characteristics of the resource use condition in this way, are both present. FIG. 10 is a graph showing the change with time t of connection condition and measured value x of resource use condition by packet users UP1 to UP5 and circuit switching users UC1 to UC5.

In such a mobile communication system, for example as shown by the communication condition at time-point $t_1$ in FIG. 10, even when, from the point of view of the latent number of connected users, the measured value x of the resource use condition could exceed the call acceptance threshold value $x_c$, unless the number of communicating users of the packet users actually performing transmission/reception of data at this time-point is small, the measured value x of the resource use condition corresponding to the number of simultaneously communicating users including both packet calls and circuit switching calls will be below the call acceptance threshold value $x_c$. If therefore at time-point $t_1$ of this communication condition, no restriction on acceptance of new calls is imposed, call requests can be accepted as normal.

If now simultaneous transmission/reception of data by latent packet users is performed from this condition, as shown by the communication condition at time-point $t_2$, the number of simultaneously communicating users increases in burst fashion. If at this point the measured value x of the resource use condition exceeds the call acceptance threshold value $x_c$ or, further, the quality deterioration threshold value $x_0$, a deterioration of communication quality for all users occurs.

The present invention was made in order to solve the above problems; in mobile communication in which multiple access is performed with shared wireless resources, its object is to provide a call acceptance control method, mobile communication system and base station device whereby deterioration of communication quality is suppressed irrespective of the switching system.

In order to achieve this object, a call acceptance control method according to the present invention in mobile communication in which packet calls produced by a packet switching system are present and multiple access is performed with shared wireless resources, for controlling acceptance of calls including the packet calls, is characterized in that the resource use condition of a predetermined wireless resource that is designated as the subject of monitoring is measured and acceptance of new calls is restricted when the measured value of the resource use condition exceeds a set call acceptance threshold value; and a correction value is calculated in accordance with the number of packet users of the packet switching system, and the restriction of the new call acceptance in accordance with the call acceptance threshold value is adjusted by using this correction value.

Also, a mobile communication system according to the present invention in which, in mobile communication in which packet calls produced by a packet switching system are present and multiple access is performed with shared wireless resources, a method of call acceptance control is applied for controlling acceptance of calls including the packet calls, is characterized in that the system measures the resource use condition of a predetermined wireless resource designated as the subject of monitoring and restricts acceptance of new calls when the measured value of the resource use condition exceeds a set call acceptance threshold value, and it comprises correction value calculation means that calculates a correction value in accordance with the number of packet users of the packet switching system; and adjustment means that adjusts the restriction of the new call acceptance in accordance with the call acceptance threshold value, by using this correction value.

Also, a base station device according to the present invention in which, in mobile communication in which packet calls produced by a packet switching system are present and multiple access is performed with shared wireless resources, a method of call acceptance control is applied for controlling acceptance of calls including the packet calls, is characterized in that it comprises resource measurement means that measures the resource use condition of a predetermined wireless resource designated as the subject of monitoring; call acceptance restriction means that restricts acceptance of new calls when the measured value of the resource use condition exceeds a set call acceptance threshold value; correction value calculation means that calculates a correction value in accordance with the number of packet users of the packet switching system; and adjustment means that adjusts the restriction of the new call acceptance in accordance with the call acceptance threshold value, by using this correction value.

In a method of call acceptance control, mobile communication system and base station device described above, in mobile communication in which packet calls are present, for example in mobile communication in which both packet calls and circuit switching calls are present, restriction of new call acceptance is performed by applying the call acceptance threshold value to the resource use condition and the method of this restriction is adjusted by a correction value calculated from the number of packet users.

If this is done, the method of restriction of new call acceptance can be adjusted in accordance with the difference of method of occupation of the wireless resource between the packet switching system and other switching system. In this way, the deterioration of communication quality in mobile communication with shared wireless resources can be satisfactorily suppressed irrespective of the respective methods of switching that are applied to the calls of a plurality of users performing multiple access.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Hereinbelow, a detailed description is given of a preferred embodiment of a call acceptance control method, mobile communication system, and base station device according to the present invention with reference to the drawings. In the description of the drawings, duplicated description is avoided by attaching the same reference symbols to identical elements. Also, the dimensional ratios of the drawings do not necessarily coincide with those of the description.

Figure 1:
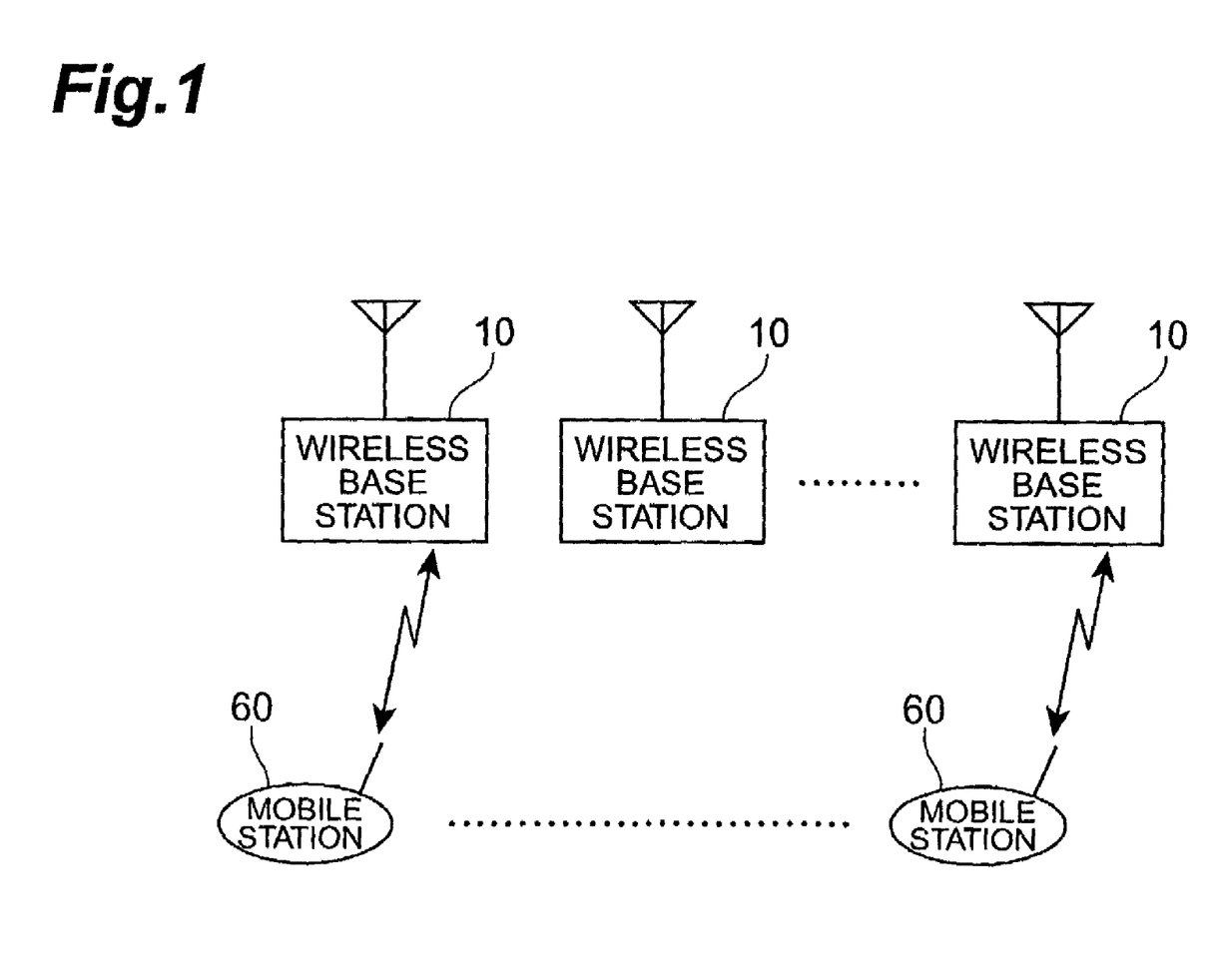
FIG. 1 is a schematic diagram illustrating the configuration of an embodiment of a mobile communication system.

FIG. 1 is a schematic diagram illustrating the configuration of an embodiment of a mobile communication system according to the present invention. The mobile communication system shown in FIG. 1 comprises a plurality of wireless base stations 10 and a plurality of mobile stations 60 that perform data communication (transmission/reception), being connected by wireless communication circuits with base stations 10. In the mobile communication system of this configuration, the communication circuits that perform transmission from mobile stations 60 to base stations are the up-link circuits and the communication circuits that perform transmission from the base stations 10 to the mobile stations 60 are the down-link circuits.

This mobile communication system is constructed as a mobile communication system that performs multiple access with shared wireless resources. Specifically, the same wireless resource is shared by the communications of users corresponding to a plurality of mobile stations 60. A detailed description of the shared wireless resources is given below.

Also, in this mobile communication system, a packet switching system and circuit switching system are both present as switching systems for performing transmission/reception of data between base stations 10 and mobile stations 60. That is, both packet calls for connection by the packet switching system and circuit switching calls for connection by the circuit switching system are present. Also, a predetermined communication system such as for example a CDMA system, FDMA system, or TDMA system is employed as the connection system.

Figure 2:
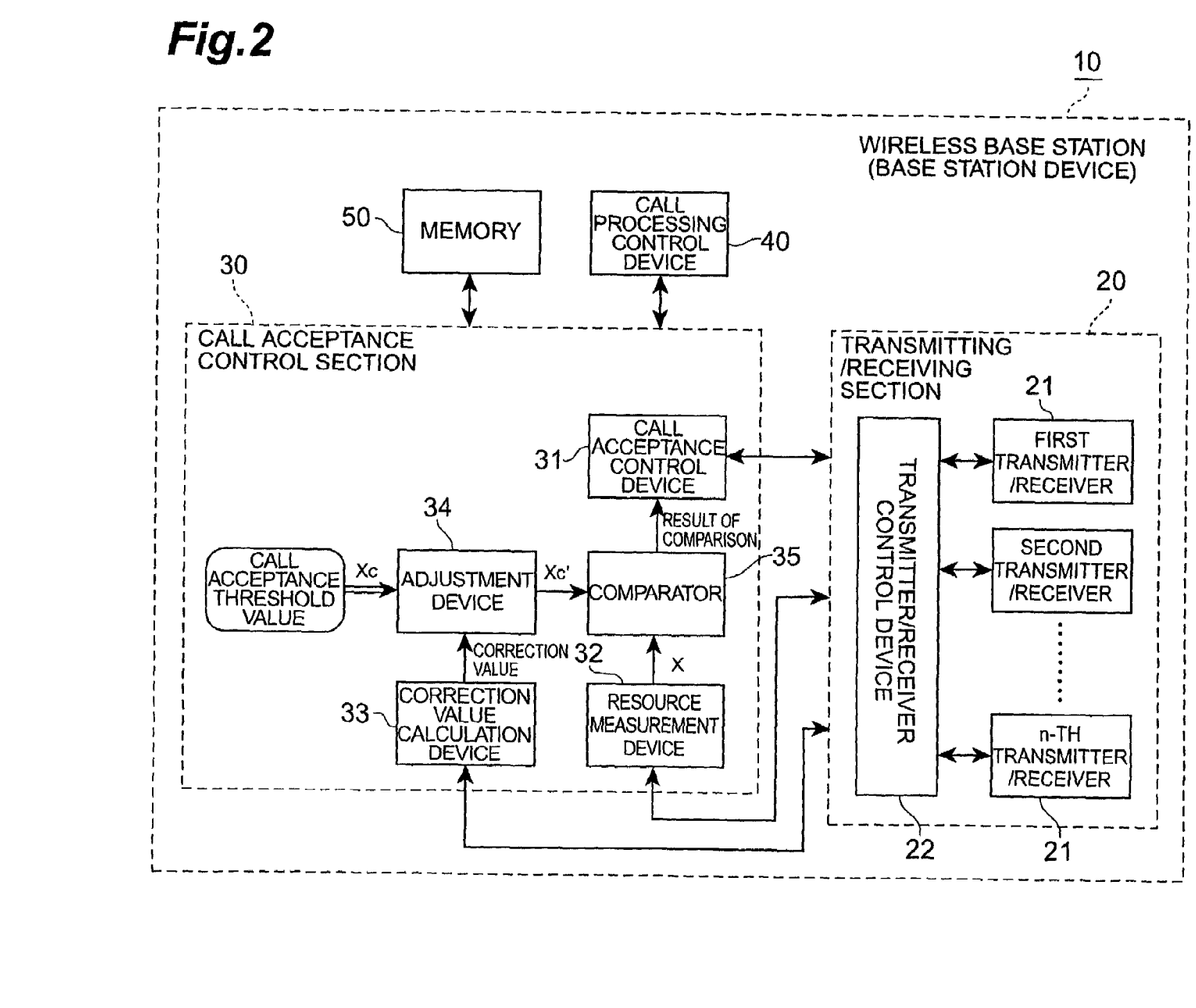
FIG. 2 is a block diagram illustrating the structure of an embodiment of a base station device.

FIG. 2 is a block diagram illustrating the structure of an embodiment of a base station device according to the present invention, employed as a wireless base station in the mobile communication system shown in FIG. 1. This base station device 10 comprises a transmitting/receiving section (transmitter/receiver) 20 and a call acceptance control section 30. Also, a call processing control device 40 and memory 50 are connected to call acceptance control section 30.

Transmitting/receiving section 20 is connected with call acceptance control section 30 and a transmission path (not shown) to the outside; it performs transmission/reception of data in accordance with instructions from call acceptance control section 30 etc. In FIG. 2, as an example of the structure of transmitting/receiving section 20, a transmitting/receiving section 20 is illustrated of a structure having n first to n-th transmitters/receivers 21 and transmitter/receiver control device 22 that respectively controls these connected to these transmitters/receivers 21.

Call acceptance control section 30 comprises a call acceptance control device 31, resource measurement device (resource measurement means) 32, correction value calculation device (correction value calculation means) 33, adjustment device (adjustment means) 34 and comparator 35. Call acceptance control device 31 is connected with transmitting/receiving section 20 and comparator 35; and in response to requests from call processing control device 40, it performs control of the call acceptance operation by transmitting/receiving section 20 and the data transmission/reception operation and also reading, updating and writing of the necessary data to memory 50.

Resource measurement device 32 is connected with transmitting/receiving section 20 and comparator 35; it measures the resource use condition of the wireless resource in transmitting/receiving section 20 and outputs this measured value to comparator 35. Correction value calculation device 33 is connected with transmitting/receiving section 20 and adjustment device 34; it calculates a correction value from the number of packet users connected by the packet switching system by transmitting/receiving section 20, and outputs this to adjustment device 34. Also, adjustment device 34 is connected with correction value calculation device 33 and comparator 35; it adjusts the set call acceptance threshold value in accordance with the correction value that is input from the correction value calculation device 33 and outputs this adjusted call acceptance threshold value to comparator 35.

Comparator 35 is connected with call acceptance control device 31, resource measurement device 32, and adjustment device 34; it compares the measured value of the resource use condition and the adjusted call acceptance threshold value and outputs the comparison result to call acceptance control device 31. Call acceptance control device 31 then performs call acceptance restriction processing in which it makes a decision to allow or reject (restrict) acceptance of new calls, in accordance with the comparison result that is input thereto. This call acceptance control device 31 and comparator 35 constitute call acceptance restriction means that restricts acceptance of new calls in accordance with the call acceptance threshold value.

Figure 3:
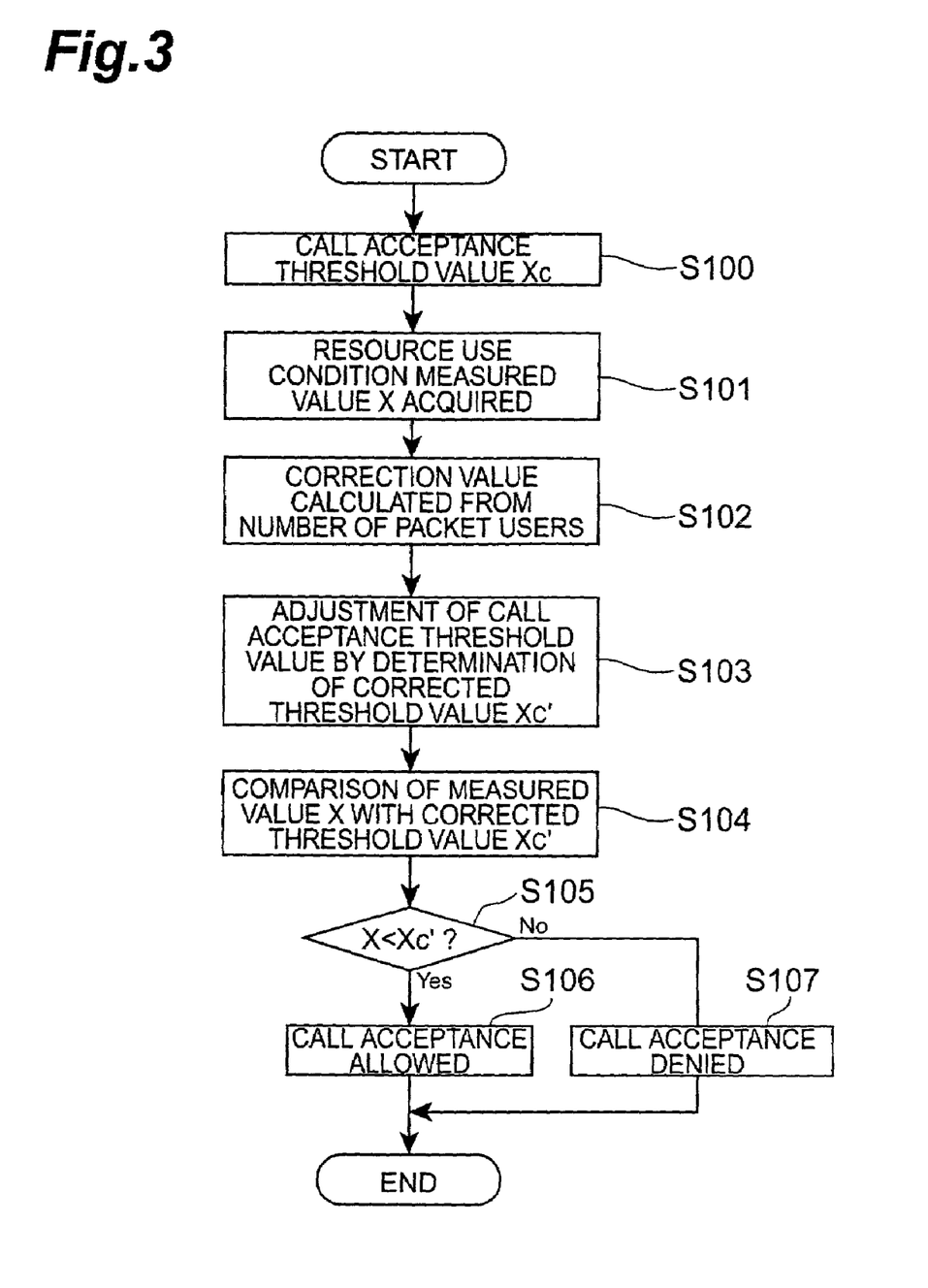
FIG. 3 is a flowchart showing an example of a call acceptance control method in a mobile communication system employing a base station device shown in FIG. 2.

FIG. 3 is a flowchart showing an example of a call acceptance control method in a mobile communication system employing the base station device 10 shown in FIG. 2. When there is a connection request for a new call (packet call or a circuit switching call) from call processing control device 40, call acceptance processing, including call acceptance restriction processing, is commenced. Thereupon, in call acceptance restriction processing, a predetermined wireless resource is designated as the subject of monitoring, and call acceptance threshold value $x_c$ is set (step S100) in respect of the resource use condition of this wireless resource that has been designated as the subject of monitoring. The necessary data of this call acceptance threshold value $x_c$ etc are stored for example in memory 50 connected with call acceptance control section 30.

In response to a newly generated call request, call acceptance restriction processing performed applying call acceptance threshold value $x_c$ is commenced. First of all, the resource use condition at transmitting/receiving section 20 is measured (S101) by resource measurement device 32, in respect of the wireless resource to be monitored. The measured value x that is thus acquired is output to comparator 35. Concurrently, a correction value in accordance with the number of packet users handled by transmitting/receiving section 20 is calculated (S102) by correction value calculation device 33. The correction value that is thus calculated is output to adjustment device 34.

Next, adjustment of the method of restriction is performed in respect of the restriction on acceptance of new calls, based on the call acceptance threshold value. In the example illustrated in FIG. 3, call acceptance threshold value $x_c$ is adjusted (S103) by adjustment device 34. Specifically, for example a corrected call acceptance threshold value (corrected threshold value) $x_c'$ is determined by performing a correction such as to lower call acceptance threshold value $x_c$ in accordance with the correction value calculated by correction value calculation device 33. The corrected threshold value $x_c'$ that is thus obtained is output to comparator 35.

Next, comparator 35 performs a comparison (S104) of the measured value x of the resource use condition that is input from resource measurement device 32 and the corrected threshold value $x_c'$ that is input from adjustment device 34. The comparison result that is thus obtained is output to call acceptance control device 31. Specifically, for example the magnitudes of measured value x and corrected threshold value $x_c'$ are compared (S105). And then, if the measured value x is greater than or equal to the corrected threshold value $x_c'$ ($x \geq x_c'$), "1" is output as the comparison result. On the other hand, if the measured value x is smaller than the corrected threshold value $x_c'$ ($x < x_c'$), "0" is output as the comparison result.

Call acceptance control device 31 performs call acceptance processing including call acceptance restriction processing in accordance with the comparison result that is input from comparator 35. Specifically, if the measured value x of the resource use condition is $x < x_c'$ (comparison result output is "0"), it controls transmitting/receiving section 20 (S106) so as to allow call acceptance. On the other hand, if the measured value x is $x \geq x_c'$ (comparison result output is "1"), call acceptance is denied (restricted) (S107).

The effects of the mobile communication system, base station device and call acceptance control method illustrated in FIG. 1 to FIG. 3 will be described while indicating specific examples of communication conditions.

In the call acceptance control method, mobile communication system and base station device according to this embodiment, in mobile communication in which packet calls are present, for example mobile communication in which both packet calls and circuit switching calls are present simultaneously, restriction of acceptance of new calls is performed by applying a call acceptance threshold value in respect of the resource use condition of the wireless resource that is being monitored and the method of this restriction is adjusted by means of a correction value calculated from the number of packet users.

The method of restricting acceptance of new calls is thereby made capable of being adjusted in accordance with the difference in the method of occupation of wireless resources by the packet switching system and other switching systems. In this way, in mobile communication in which wireless resources are shared, deterioration of communication quality can be satisfactorily suppressed irrespective of the switching system that is respectively applied to a plurality of user calls connected for multiple access.

Figure 4:
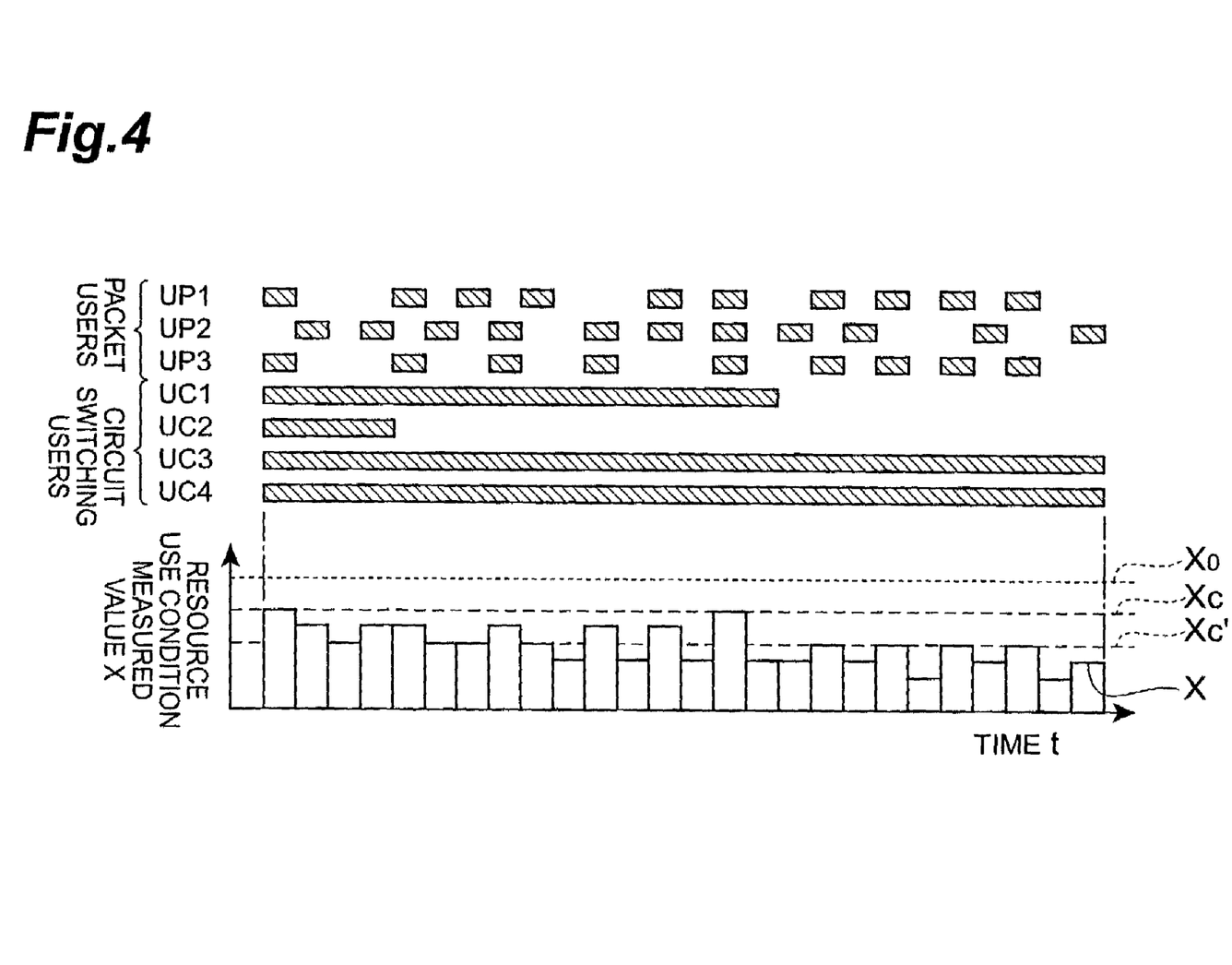
FIG. 4 is a graph illustrating the communication condition in a mobile communication system in which the call acceptance control method illustrated in FIG. 3 is applied.

FIG. 4 shows an example of the communication condition when the call acceptance control method illustrated in FIG. 3 is applied to a mobile communication system in which both packet calls and circuit switching calls are present and that share the same wireless resources.

FIG. 4 is a graph illustrating the change with time t of the connection condition by packet users UP1 to UP3 and circuit switching users UC1 to UC4 and the measured value x of the resource use condition, with the horizontal axis being the time axis. On the graph showing the time variation of the measured value x of the resource use condition, there are respectively shown the call acceptance threshold value $x_c$, corrected threshold value $x_c'$ and measured value x and quality deterioration threshold value $x_0$ at which communication quality deterioration actually occurs, described above with reference to the flowchart of FIG. 3.

The variation characteristic of the resource use condition is different in the case of connection by packet calls and connection by circuit switching calls, due to the difference in the method of occupation of wireless resources in the respective switching systems. That is, in the case of connection of mobile communication using circuit switching calls, there is little variation of the number of simultaneously communicating users and the resource use condition at each time-point, since each user, whilst connected, continuously occupies the wireless resource respectively (see FIG. 8).

In contrast, in the case of connection of mobile communication using packet calls, due to their irregular character and burst character, there is considerable fluctuation in the number of simultaneously communicating users and the resource use condition at each time-point (see FIG. 9). Consequently, in a mobile communication system in which packet calls are present, if the packet users including latent packet users simultaneously perform data transmission/reception, the wireless resources to be shared are insufficient and deterioration of communication quality for all users may occur.

For example, in the CDMA system, there is the problem that if the wireless resource represented by the amount of up-link interference increases or the down-link transmission power is insufficient, the desired signal to noise power ratio (S/N ratio) is not obtained and transmission errors occur frequently. Also, in the case of the FDMA system or TDMA system, there is the problem that, if the wireless resource represented by the modem devices is insufficient, loss of communication data occurs.

In accordance with this variation characteristic of the resource use condition, the variation characteristic of the resource use condition in a mobile communication system in which packet calls and circuit switching calls are both present changes depending on the proportion of the number of packet users to the total number of users. Consequently, in such a mobile communication system, guaranteed communication quality cannot be sufficiently achieved by call acceptance control solely by restricting acceptance of new calls by setting the call acceptance threshold value. Specifically, for example the communication quality of the circuit switching calls during communication by simultaneous transmission with packet calls is suppressed and in some cases the possibility may arise of circuit switching calls being forcibly disconnected.

To deal with this, as shown in the graph of FIG. 4, if it is arranged to employ a corrected threshold value $x_c'$ of lowered threshold value obtained by correcting the call acceptance threshold value $x_c$ using the correction value calculated in accordance with the number of packet users, the method of restricting new call acceptance is adjusted in accordance with the ratio of the number of packet users to the total number of users. Guaranteed communication quality can therefore be satisfactorily achieved irrespective of the presence of packet calls.

Various types of wireless resource may be employed as the wireless resource that is shared by multiple access from the users and whose resource use condition is monitored. Examples that may be given of such wireless resources include, in the case of a CDMA system, the up-link interference amount, down-link transmission power and spreading code. Examples that may be given in the case of an FDMA system include the base station modems, transmission power and carriers. Examples that may be given in the case of a TDMA system include the base station modems, transmission power and time slots. In each case, these wireless resources are resources that are shared irrespective of the switching system (packet switching system or circuit switching system).

Specifically, for example in a CDMA type mobile communication system, a configuration is possible in which the number of spreading codes is used as the wireless resource that is monitored. As the correction value in this case, the number of spreading codes employed by the packet users that are waiting to transmit at each time-point may be calculated and employed.

Alternatively, in the case of a CDMA type mobile communication system, a configuration is possible in which the amount of up-link interference is employed as the wireless resource to be monitored. As the correction value in this case, the inferred value obtained by inferring the amount of up-link interference when the packet users who are waiting to transmit transmit simultaneously can be employed. The amount of up-link interference can easily be inferred using the known logic of the CDMA system. Specifically, the method can be employed for example of finding the sum thereof from the reception power required by the users.

Alternatively, in a mobile communication system of the CDMA type, FDMA type or TDMA type, a configuration is possible in which the down-link transmission power is employed as the wireless resource to be monitored. As the correction value in this case, the value obtained by adding up the sum of transmission power required when the packet users who are waiting to transmit transmit simultaneously may be employed. Apart from this, the method of restricting acceptance of new calls may be adjusted by calculating a correction value in the same way but taking the wireless resource to be monitored as being the number of modems, number of carriers, or number of time slots etc.

Figure 5:
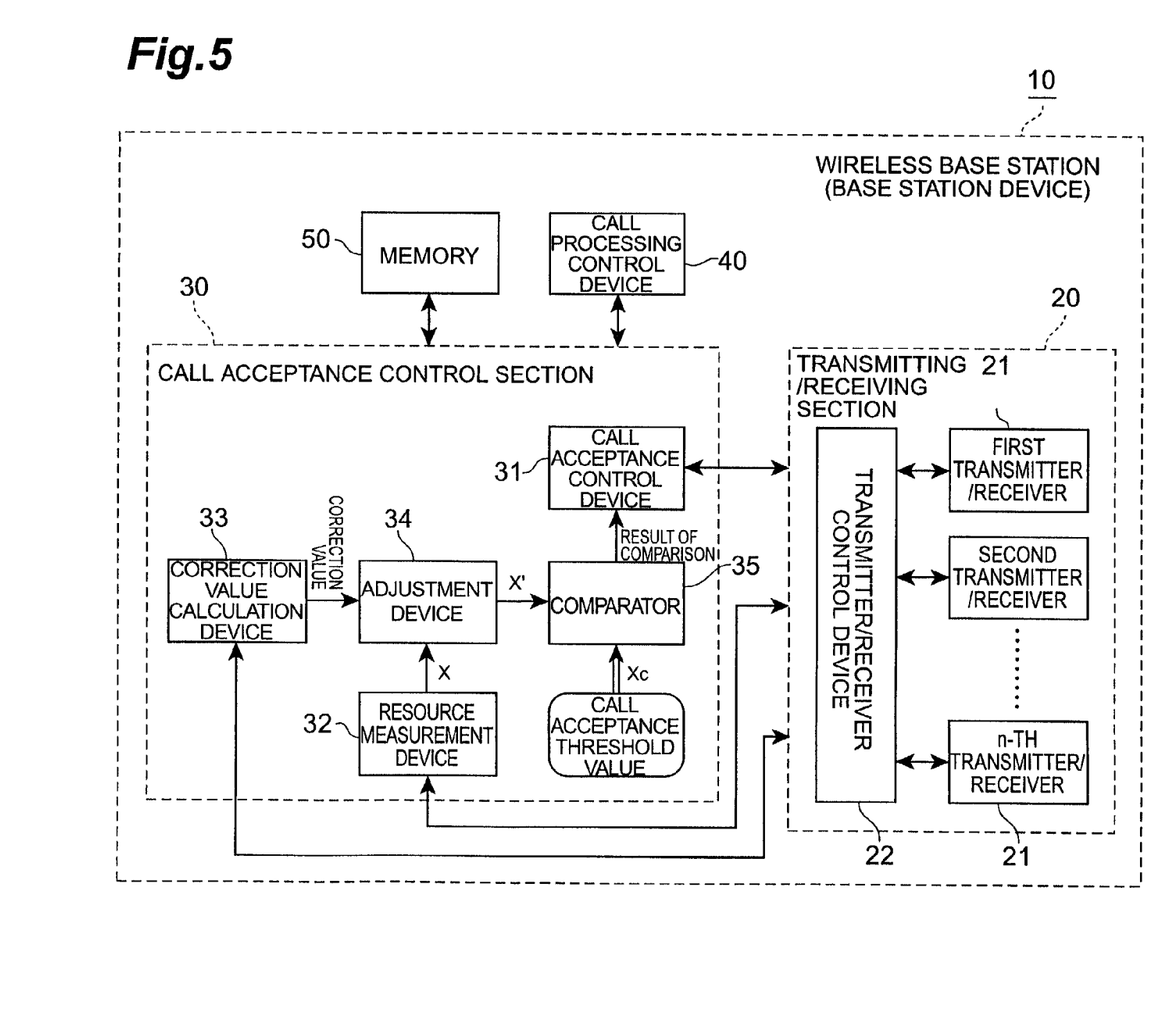
FIG. 5 is a block diagram illustrating the structure of another embodiment of a base station device.

FIG. 5 is a block diagram illustrating the structure of another embodiment of a base station device according to the present invention employed as a wireless base station in the mobile communication system illustrated in FIG. 1. This base station device 10 comprises a transmitting/receiving section (transmitter/receiver) 20 and a call acceptance control section 30. Also, a call processing control device 40 and memory 50 are connected to call acceptance control section 30. The structure etc. of the transmitting/receiving section 20, call processing control device 40 and memory 50 is the same as in the case of the base station device of the embodiment shown in FIG. 2.

Call acceptance control section 30 comprises a call acceptance control device 31, resource measurement device 32, correction value calculation device 33, adjustment device 34 and comparator 35. Call acceptance control device 31 is connected with transmitting/receiving section 20 and comparator 35; and in response to requests from call processing control device 40, it performs control of the call acceptance operation by transmitting/receiving section 20 and the data transmission/reception operation and also reading, updating and writing of the necessary data to memory 50.

Resource measurement device 32 is connected with transmitting/receiving section 20 and adjustment device 34; it measures the resource use condition of the wireless resource in transmitting/receiving section 20 and outputs this measured value to adjustment device 34. Correction value calculation device 33 is connected with transmitting/receiving section 20 and adjustment device 34; it calculates a correction value from the number of packet users connected by the packet switching system by transmitting/receiving section 20 and outputs this to adjustment device 34. Also, adjustment device 34 is connected with resource measurement device 32, correction value calculation device 33 and comparator 35; it adjusts the measured value of the resource use condition input from resource measurement device 32 in accordance with the correction value that is input from the correction value calculation device 33 and outputs this adjusted measured value to comparator 35.

Comparator 35 is connected with call acceptance control device 31 and adjustment device 34; it compares the set call acceptance threshold value and the measured value after adjustment and outputs the result of this comparison to call acceptance control device 31. Call acceptance control device 31 then performs call acceptance restriction processing in which it decides whether to allow or reject (restrict) acceptance of new calls, in accordance with the comparison result that is input. This call acceptance control device 31 and comparator 35 constitute call acceptance restriction means that restricts acceptance of new calls in accordance with the call acceptance threshold value.

Figure 6:
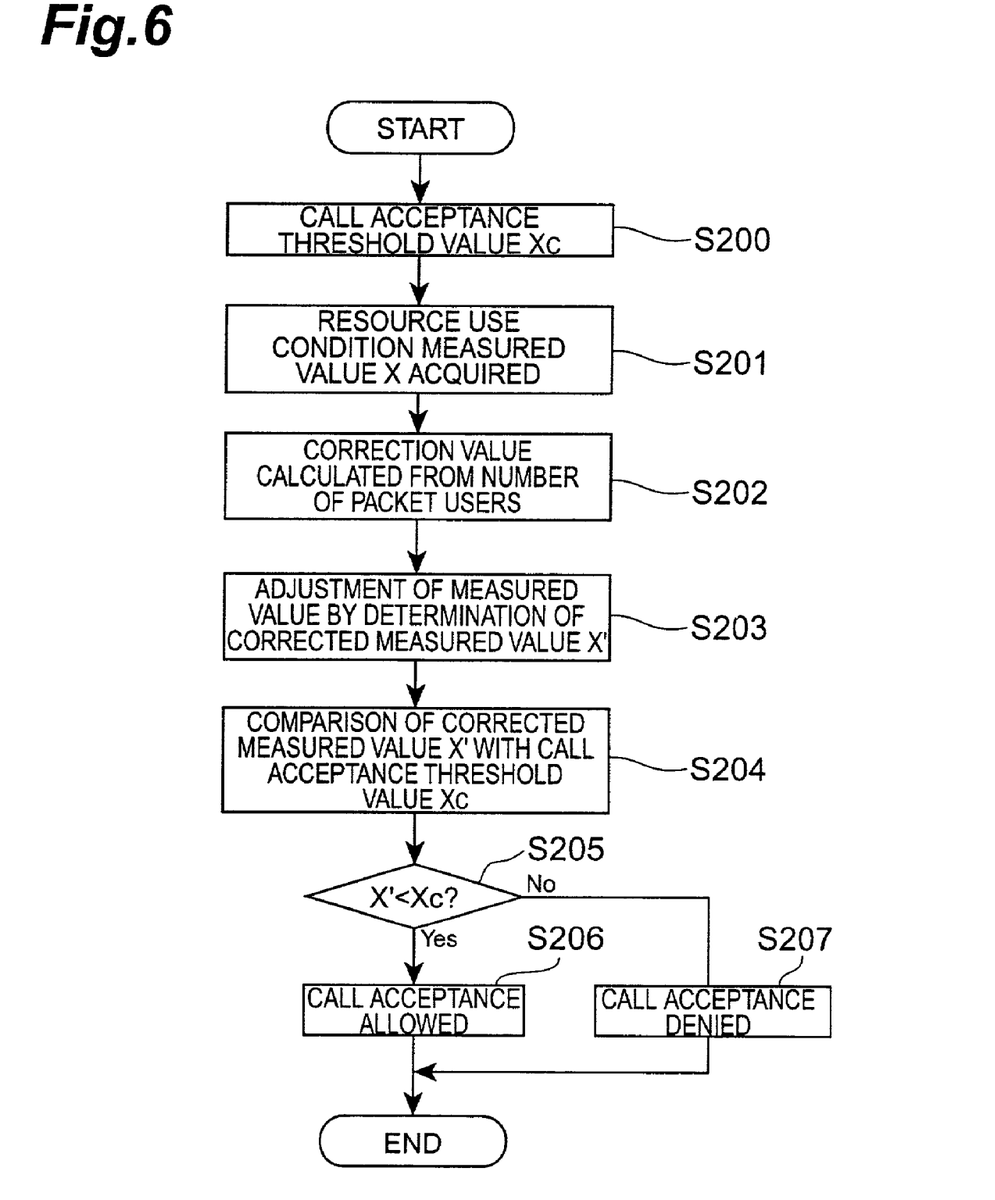
FIG. 6 is a flowchart showing an example of a call acceptance control method in a mobile communication system employing a base station device shown in FIG. 5.

FIG. 6 is a flowchart showing an example of a call acceptance control method in a mobile communication system employing the base station device 10 shown in FIG. 5. When there is a connection request for a new call (packet call or circuit switching call) from call processing control device 40, call acceptance processing including call acceptance restriction processing is commenced. At this point, in the call acceptance restriction processing, a predetermined wireless resource is designated as the subject of monitoring and a call acceptance threshold value $x_c$ is set (step S200) in respect of the resource use condition of the wireless resource that is to be monitored.

Call acceptance restriction processing is commenced in which the call acceptance threshold value $x_c$ is applied in respect of newly generated call requests. First of all, in respect of the wireless resource that has been designated for monitoring, the resource use condition in transmitting/receiving section 20 is measured (S201) by means of resource measurement device 32. The measured value x that is thus acquired is output to adjustment device 34. Simultaneously, correction value calculation device 33 calculates a correction value (S202) in accordance with the number of packet users handled by transmitting/receiving section 20. The calculated correction value is output to adjustment device 34.

Next, adjustment of the method of restriction is performed in respect of the restriction of acceptance of new calls, in accordance with the call acceptance threshold value. In the example shown in FIG. 6, the measured value x of the resource use condition is adjusted (S203) in adjustment device 34. Specifically, for example a measured value after correction (corrected measured value) x' is determined by performing a correction in which the measured value x is raised, using the correction value calculated by correction value calculation device 33. The corrected measured value x' which is thus obtained is output to comparator 35.

Next, comparator 35 performs a comparison (S204) of the corrected measured value x' input from adjustment device 34 and the set call acceptance threshold value $x_c$. The comparison result that is thus obtained is output to call acceptance control device 31. Specifically, for example the magnitudes of corrected measured value x' and call acceptance threshold value $x_c$ are compared (S205). And then, if the corrected measured value x' is greater than or equal to the call acceptance threshold value $x_c$ (x'$\geq x_c$), "1" is output as the comparison result. On the other hand, if the corrected measured value x' is smaller than the call acceptance threshold value $x_c$ (x'<$x_c$), "0" is output as the comparison result.

Call acceptance control device 31 performs call acceptance processing including call acceptance restriction processing in accordance with the comparison result that is input from comparator 35. Specifically, if the corrected measured value x' of the resource use condition is x'<$x_c$ (comparison result output is "0"), it controls transmitting/receiving section 20 (S206) so as to allow call acceptance. On the other hand, if the corrected measured value x' is x'$\geq x_c$ (comparison result output is "1"), call acceptance is denied (restricted) (S207).

With the base station device and call acceptance control method according to this embodiment, as in the case when the base station device and call acceptance control method illustrated in FIG. 2 and FIG. 3 are employed, the method of restricting acceptance of new calls can be adjusted in accordance with the differences in the method of occupation of wireless resources of the packet switching system and other switching systems. In this way, deterioration of communication quality can be satisfactorily suppressed irrespective of the switching system that is respectively applied in the calls of a plurality of users performing multiple access.

Figure 7:
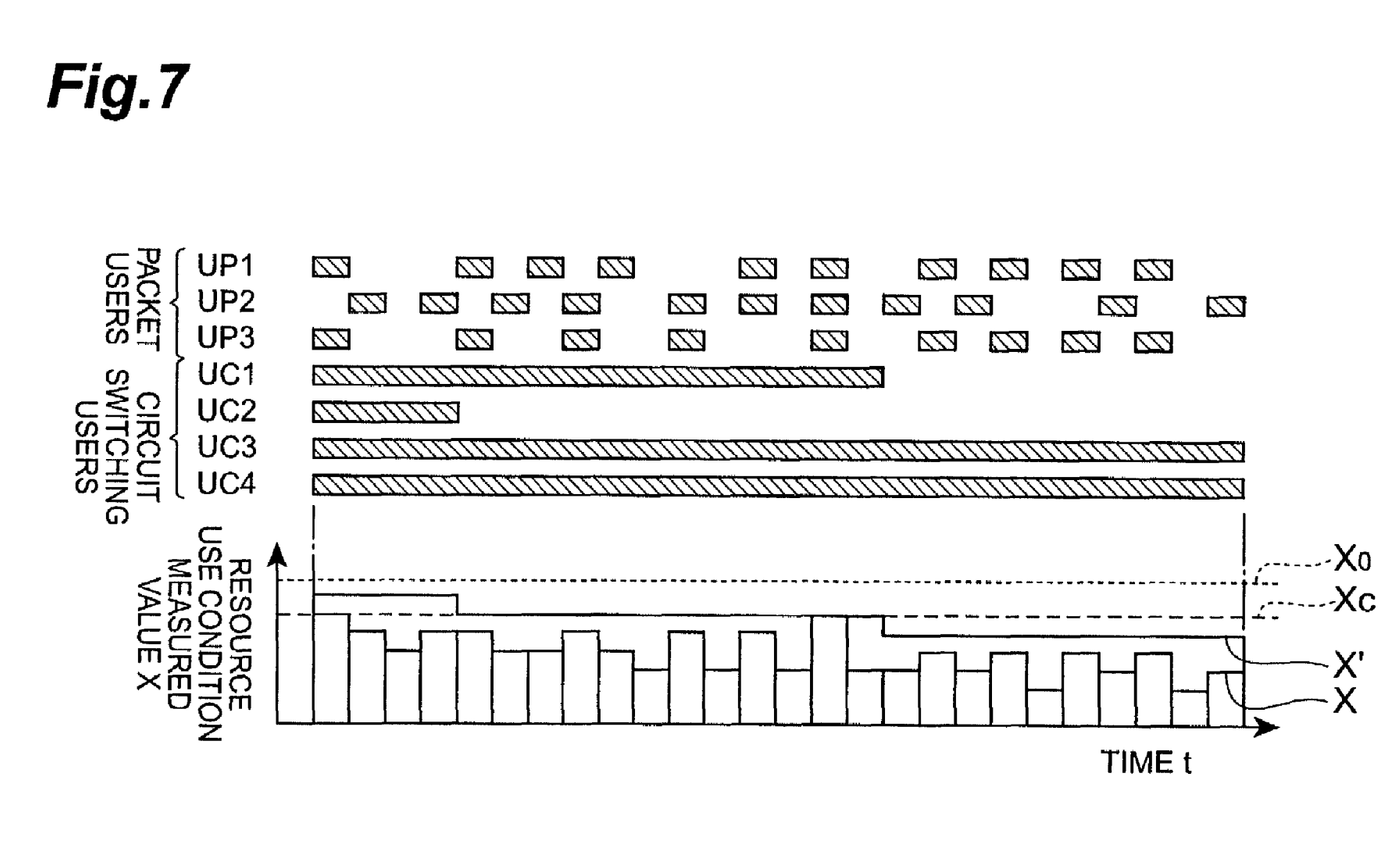
FIG. 7 is a graph illustrating the communication condition in a mobile communication system in which the call acceptance control method illustrated in FIG. 6 is applied.

FIG. 7 shows an example of the communication condition when the call acceptance control method illustrated in FIG. 6 is applied to a mobile communication system wherein the same wireless resource is shared and in which both packet calls and circuit switching calls are present.

FIG. 7 is a graph illustrating the change with time t of the connection condition by packet users UP1 to UP3 and circuit switching users UC1 to UC4 and the measured value x of the resource use condition, with the horizontal axis being the time axis. On the graph showing the time variation of the measured value x of the resource use condition, the call acceptance threshold value $x_c$, measured value x, and corrected measured value x' and the quality deterioration threshold value $x_0$ at which communication quality deterioration actually occurs, described above with reference to the flowchart of FIG. 6, are respectively shown.

As shown in the graph of this FIG. 7, if the measured value x is corrected using the correction value calculated in accordance with the number of packet users and the corrected measured value x' obtained by using this to raise the measured value is employed, the method of restriction of new call acceptance is adjusted in accordance with the ratio of the number of packet users to the total number of users. Communication quality can therefore be fully guaranteed irrespective of the presence of packet calls.

The wireless resource selected as the subject of monitoring and the method of calculating the correction value etc are the same as in the case of the embodiment shown in FIG. 2 and FIG. 3.

The call acceptance control method, the mobile communication system and base station device according to the present invention are not restricted to the embodiments described above but could be modified in various ways.

For example, in the embodiments described above, in mobile communication in which packet calls are present, the method of restricting new call acceptance is adjusted in accordance with the number of packet users. In contrast, in cases where for example guaranteed-bandwidth packet calls using the guaranteed-bandwidth packet switching system and non-guaranteed-bandwidth packet calls using a non-guaranteed-bandwidth packet switching system are both present, a configuration can be employed in which the method of restriction of new call acceptance is adjusted by calculating the correction value using the number of guaranteed-bandwidth packet users connected by guaranteed-bandwidth packet calls, rather than employing the total number of packet users.

Specifically, in the case of non-guaranteed-bandwidth packet calls, packet transmission can be preserved in accordance with requirements. Consequently, in the case of non-guaranteed-bandwidth packet calls, generation of resource insufficiency and the resulting deterioration of communication quality can be avoided by preserving packet transmission by non-guaranteed-bandwidth packet calls in periods where the resource use condition is depressed.

On the other hand, in case of guaranteed-bandwidth packet calls, since the bandwidth i.e. the transmission rate must be guaranteed, packet transmission cannot be preserved. Consequently, guaranteed-bandwidth packet calls are a factor causing resource insufficiency and deterioration of communication quality.

To deal with this, if a correction value is calculated in accordance with the number of guaranteed-bandwidth packet users and adjustment of restriction of new call acceptance is performed using this correction value, restriction of new call acceptance and consequently a guarantee of communication quality can be efficiently achieved.

Apart from this, various modifications are possible concerning the structure of the mobile communication system and base station device or the procedure of the call acceptance control method etc. For example, for the calculation of the correction value by correction value calculation device 33 of base station device 10 shown in FIG. 2 and FIG. 5, the correction value could be calculated in real time or a fixed correction value could be output. In particular, call acceptance control can be performed efficiently by calculating the correction value in real time.

Also, concerning the measurement of resource use condition by resource measurement device 32, a configuration in which this is performed when a call request is generated or a configuration in which this is performed periodically are possible. Also, it is preferable to suitably alter the procedure in respect of the call acceptance control method shown in the flowcharts of FIG. 3 and FIG. 6 corresponding to such alterations in the structure of base station device 10 (the mobile communication system).

As described in detail above, with the call acceptance control method, mobile communication system and base station device according to the present invention, the following effects are obtained. That is, with the call acceptance control method, mobile communication system and base station device whereby a restriction of new call acceptance is performed by applying a call acceptance threshold value in respect of the resource use condition in mobile communication in which packet calls are present and adjusting this method of restriction by a correction value calculated from the number of packet users, deterioration in the communication quality can be satisfactorily suppressed irrespective of the switching system respectively applied to the plurality of user calls connected by multiple access.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A call acceptance control method in a mobile communication system including packet users and an associated packet switching system producing packet calls and other users and an associated circuit switching system producing other calls, the method comprising:
   connecting the packet users and the other users to provide multiple access calls with shared wireless resources;
   measuring a resource use condition based upon existing connections provided by the connecting step;
   restricting acceptance of new calls for connection in the connecting step when a value of said resource use condition measured in the measuring step exceeds a set call acceptance threshold value;
   calculating a correction value in accordance with a number of actively connected packet users of said packet switching system; and
   adjusting the restriction of said new call acceptance in accordance with said call acceptance threshold value in the restricting step by using the correction value calculated in the calculating step, wherein the restriction of said new call acceptance is adjusted by lowering said call acceptance threshold value in accordance with said calculated correction value.

2. A mobile communication system including packet users and an associated packet switching system producing packet calls and other users and an associated circuit switching system producing other calls, comprising:
   a transmitting/receiving section configured to connect with the packet users and the other users to provide multiple access calls with shared wireless resources;
   a resource measurement device configured to measure a resource use condition based upon existing connections provided by the transmitting/receiving section;
   a call acceptance control device configured to restrict acceptance of new calls by the transmitting/receiving section when a measured resource use condition value from said resource measurement device exceeds a set call acceptance threshold value;
   a correction value calculation device that calculates a correction value in accordance with a number of actively connected packet users of said packet switching system; and
   an adjustment device that adjusts the restriction of said new call acceptance by the transmitting/receiving section in accordance with said correction value, wherein said adjustment device adjusts the restriction of said new call acceptance by lowering said call acceptance threshold value in accordance with said correction value calculated by said correction value calculation device.

3. A base station device configured to provide mobile communication for packet users and an associated packet switching system producing packet calls and for other users and an associated circuit switching system producing other calls, comprising:
   a transmitting/receiving means for connecting the base station with the packet users and the other users to provide multiple access calls with shared wireless resources;
   resource measurement means for measuring a resource use condition based upon existing connections provided by the transmitting/receiving means;
   call acceptance restriction means for restricting acceptance of new calls by the transmitting/receiving means when a measured resource use condition value from said resource measurement means exceeds a set call acceptance threshold value;
   correction value calculation means for calculating a correction value in accordance with a number of actively connected packet users of said packet switching system; and
   adjustment means for adjusting the restriction of said new call acceptance by the transmitting/receiving means in accordance with said correction value, wherein said adjustment means adjusts the restriction of said new call acceptance by lowering said call acceptance threshold value in accordance with said correction value calculated by said correction value calculation means.

* * * * *

UNITED STATES PATENT AND TRADEMARK OFFICE
CERTIFICATE OF CORRECTION

PATENT NO. : 7,492,784 B2  
APPLICATION NO. : 10/044945  
DATED : February 17, 2009  
INVENTOR(S) : Iwamura et al.

Page 1 of 1

It is certified that error appears in the above-identified patent and that said Letters Patent is hereby corrected as shown below:

On the title page, Item (75), the Inventors information is incorrect. Item (75) should read:

-- (75) Inventors: Mikio Iwamura, Zushi (JP); Yoshihiro Ishikawa, Yokosuka (JP); Seizo Onoe, Yokohama (JP); Takehiro Nakamura, Yokosuka-sho (JP); Takahiro Hayashi, Yokosuka (JP); Yoshiaki Ofuji, Yokosuka (JP) --

Signed and Sealed this

Twenty-eighth Day of April, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,492,784 B2
APPLICATION NO. : 10/044945
DATED : February 17, 2009
INVENTOR(S) : Iwamura et al.

Page 1 of 1

It is certified that error appears in the above-identified patent and that said Letters Patent is hereby corrected as shown below:

On the title page, Item (75), the Inventors information is incorrect. Item (75) should read:

-- (75) Inventors: Mikio Iwamura, Zushi (JP); Yoshihiro Ishikawa, Yokosuka (JP); Seizo Onoe, Yokohama (JP); Takehiro Nakamura, Yokosuka-shi (JP); Takahiro Hayashi, Yokosuka (JP); Yoshiaki Ofuji, Yokosuka (JP) --

This certificate supersedes the Certificate of Correction issued April 28, 2009.

Signed and Sealed this

Seventh Day of July, 2009

JOHN DOLL
*Acting Director of the United States Patent and Trademark Office*